United States Patent Office 2,988,044
Patented June 13, 1961

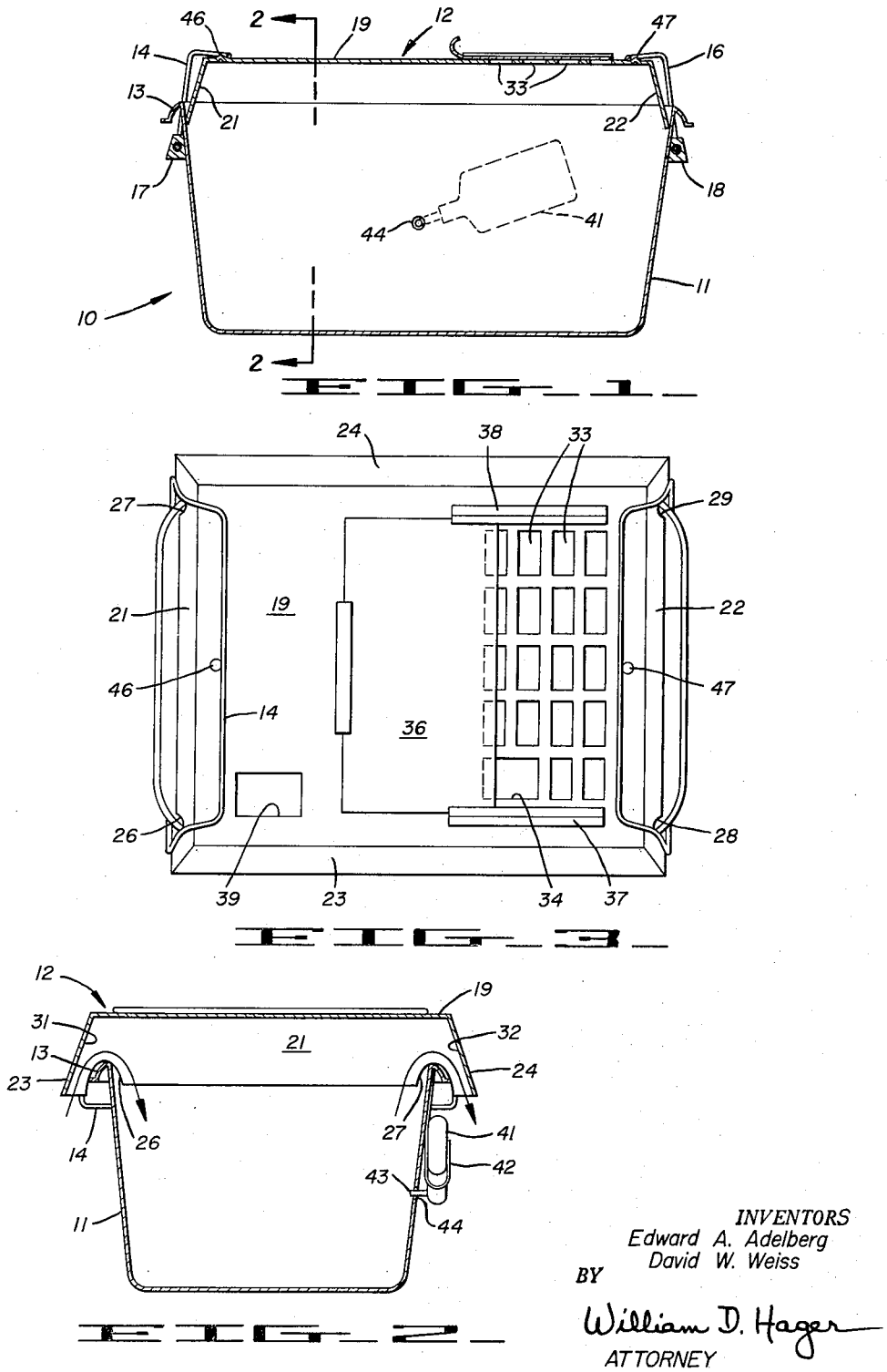

2,988,044
ANIMAL ENCLOSURE
Edward A. Adelberg, 2574 Buena Vista Way, Berkeley 8, Calif., and David W. Weiss, 1153 Shattuck Ave., Berkeley 7, Calif.
Filed Nov. 17, 1958, Ser. No. 774,552
3 Claims. (Cl. 119—15)

The present invention relates generally to the housing of animals, and more particularly to an improved animal enclosure or cage which is especially well adapted to house a variety of small laboratory animals.

In various medical and other experimental laboratories, small animals such as rabbits, guinea pigs, hamsters, mice, rats, and the like, are conventionally maintained under controlled conditions so as to study hereditary, infectous, and contagious disorders and the effects of medicines and other treatments on such disorders. A large number of such laboratory animals are commonly quartered in a given laboratory, and therefore it is desirable that the means employed to house the animals consume a minimum amount of storage space and be as economical and durable as possible. In addition, the animal housing means should require a minimum of cleaning and washing procedures and permit easy handling in order to reduce maintenance labor requirements to a minimum. Moreover, inasmuch as the animals may be purposely variously subjected to infection, fatigue or other privations, for the purpose of study, it is imperative that the means utilized to house the infected animals protect each individual animal against extraneous infection from caretakers and other personnel, as well as from other animals in the animal quarter. Otherwise, the animals under study may communicate additional ailments, thereby adversely affecting the control conditions imposed for the purpose of study and rendering the experimental results obtained worthless. Conversely, the animal cages or other housing means must be incommunicable to infection for the sake of maximum personnel safety.

The present invention provides an improved animal cage which, unlike conventional laboratory animal housing means, fulfills all of the foregoing requirements as well as possesses further advantages over the prior art.

It is therefore a principal object of the present invention to provide an improved animal cage which is suitable for housing a variety of laboratory animals, whether infected or non-infected, with the utmost of sanitation and protection against communication of disease.

Another object of this invention is the provision of an economical, durable animal enclosure which is light in weight to permit easy handling with a minimum of danger of laceration of the operator's hands.

Still another object of the present invention contemplates the provision of an improved animal cage which does not require special washing facilities and labor for cleaning.

It is yet another object of the invention to provide an animal cage which may be stored by nesting so as to be storageable with a minimum demand on space.

An extremely important object of the present invention is the provision of a completely closed animal enclosure which yet permits free access of air to animals housed therein.

It is a further object of the invention to provide an improved animal cage wherein sharp corners and edges are eliminated.

Additional objects and advantages of the invention will become aparent upon consideration of the following description in conjunction with the accompanying drawings, in which:

FIGURE 1 is a cross-sectional side elevational view of a preferred embodiment of the animal cage of this invention, FIGURE 2 is a cross-sectional view taken along the line 2—2 of the embodiment of FIGURE 1 and illustrating the provisions therein for the free passage of air into the cage, and FIGURE 3 is a top plan view of the embodiment illustrating particularly the novel top of the cage.

Considering now the invention in some detail and referring to the illustrated form thereof in the drawing, there is provided an improved animal cage 10 in accordance with the present invention. The cage 10 generally comprises a receptacle 11 having a bottom wall and side and end walls, and a detachable lid 12 which is adapted to engage the open top of the receptacle to provide a complete closure of the cage which yet permits free access of air to the interior thereof.

As regards the structural details of receptacle 11, it is to be noted that same is preferably fabricated from a suitable light weight durable material, such as aluminum. Other structural materials, as for example, various plastics, may also be employed, however, in the construction of receptacle 11. In order that large numbers of the receptacles 11 may be stored in a relatively small storage space, the side and end walls of receptacle 11 are advantageously tapered downward towards the bottom wall thereof to facilitate storage by nesting. Moreover, all corners of the receptacle 11 as well as the rim 13 thereof are preferably rounded to prevent the accumulation of animal waste and dirt and to eliminate the possibility of scratch injuries to both animals and personnel. The rounded edge corners also provide a continuous rounded interior surface to the receptacle and thus facilitate easy cleaning of same. To permit easy handling of cage 10, as well as to provide means for locking lid 12 in place in a manner which is subsequently described, receptacle 11 is further, preferably provided with a pair of L-shaped peripherally framed handles 14, 16. Such handles are respectively journalled to the end walls of the receptacle as by means of transversely extending brackets 17, 18 projecting outwardly therefrom.

In practice it has been found that receptacles fulfilling all of the requirements of receptacle 11 set forth hereinbefore, are advantageously commercially available in assorted sizes suitable for housing a wide variety of species of laboratory animals. More particularly, a receptacle manufactured for the meat trade by the Aluminum Cooking Utensils Company, New Kensington, Pa., and known commercially as a "tote box," may be advantageously employed as the receptacle 11 of the present invention. The box described in the company's catalogue No. 66–D, item 4502, (Tote Box "24"), is suitable for housing rabbits, guinea pigs, hamsters, and other laboratory animals of equivalent size. Boxes of the same type but of different dimensions are also available and can be readily used to house other laboratory animals of different size, such as, mice and rats.

Considering now the novel structure of the lid 12 of animal cage 10, it is to be noted that same is best fabricated from light weight structural material, for example sheet aluminum, and is adapted for detachable engagement with the open top of receptacle 11 to form a complete closure therewith. Lid 12 has a top wall 19 with pendent end walls 21, 22 and side walls 23, 24 preferably tapered outwardly therefrom to permit storage of the lids by nesting. All corners of the lid 12 are best rounded, as in the case of receptacle 11, to eliminate sharp edges and facilitate easy cleaning thereof.

The end walls 21, 22 of lid 12 respectively have arcuate cut-outs or notches 26, 27 and 28, 29 for engaging the rounded side rims of receptacle 11. Notches 26, 27 and 28, 29 are of such a depth that when engaged with the rim of receptacle 11, the edges of outwardly tapered end walls 21, 22 are in close abutment with the interior end wall surfaces of the receptacle, thus forming a closure therewith. Moreover, with notches 26, 27 and 28, 29 in engagement with the rim 13 of receptacle 11, the top wall 19 of lid 12 is elevated above the rim of the receptacle and side walls 23, 24 overhang such rim in outwardly spaced relation therefrom. There are thus provided between side walls 23, 24 and the rim of receptacle 11, longitudinally extending louvered air spaces 31, 32 which permit free access of air to the interior of receptacle 11 while lid 12 forms a complete closure therewith. Accordingly, by virtue of the tortuous path through air spaces 31, 32 from within to without cage 10 and vice versa, personnel are protected from experimentally infected animals housed within the cage and the animals are protected from accidental infection while air is still freely supplied to the animals within.

In order to permit ready observation of animals housed within cage 10, one section of the top wall 19 of lid 12 is preferably provided with a plurality of rectangular or round perforations 33. One perforation 34 may, moreover, be advantageously made larger than the other perforations 33 to permit the introduction of leaf or root vegetables into the cage without necessitating removal of lid 12. The perforations 33, 34 may be closed when complete closure of the cage is desired as by means of a cover plate 36 slideably engaging a pair of spaced guide rails 37, 38 secured to the exterior of top wall 19. A rectangular opening 39 may be additionally provided at one end of top wall 19 of lid 12 to permit entry of a conventional food-chute which can be filled without disturbing lid or cage.

In order to supply water or other liquids to animals within cage 10, a water bottle 41 or equivalent means may be supported externally adjacent one side of receptacle 11 as by means of a bent wire holder 42 secured to lid 12 or the side of the receptacle as shown in FIGURE 2. The nozzle 43 of the bottle 41 may then be introduced to the interior of the cage via a small hole 44 through the side of receptacle 11.

It will be noted that the arrangement of the lid end walls 21, 22 with notches 26, 27 and 28, 29 provided therein prevents lid 12 from moving or slipping in any longitudinal or lateral direction with respect to receptacle 11. To prevent the lid from being lifted off of the receptacle by a large animal, the lid may be locked in position atop the receptacle by means of the L-shaped handles 14, 16. More particularly, raised elevations 46, 47 are preferably provided at opposite ends of top wall 19 of the lid 12. The handles 14, 16 may then be rotated upwardly and the projecting arms thereof locked against elevations 46, 47 (see FIGURE 3). Handles 14, 16 thus firmly lock lid 12 in place atop receptacle 11.

It will thus be seen that the present invention provides a compact, light weight, durable animal cage which is suitable for housing many species of laboratory animals with a maximum of sanitation and protection against communication of disease. The particularly novel feature of the louvered-air spaces 31, 32 between the overhanging side walls of the lid 12 and receptacle 11 permits free passage of air to the interior of the cage even though a complete closure of the cage is at the same time provided to protect personnel from experimentally infected animals as well as to protect the animals from accidental infection. The cages 10 of the present invention, moreover, may be stored in a small fraction of the space heretofore required for storage of conventional animal cages by virtue of the tapered walls of both the receptacle 11 and lid 12 which facilitate nesting of same. In addition, the rounded edges employed in the construction of both the receptacle 11 and lid 12 are non-conducive to the accumulation of animal waste and dirt therein and thereby facilitate easy cleaning. In fact, experiments in which different animals were housed in a cage 10 in accordance with the present invention for periods up to 12 days revealed that the cages need not be washed to obtain complete cleanliness after use. More specifically, with the lid 12 removed from the receptacle 11, such receptacle, together with the bedding and animal waste, may be autoclaved for sterilization and then dried under vacuum in the autoclave. The bedding and waste can then be removed by lightly tapping the bottom of the overturned receptacle over a disposal container. No dirty material remains behind, and the receptacle is immediately ready for reuse.

Although the initial cost of the cage 10 of the present invention is of the same order as conventional animal cages, it will be found in practice that the savings realized in labor and storage space due to the "no washing" and nesting features of the present cage, as well as its ability to safely house normal and infected animals of different species, renders the present cage vastly more economical and desirable than previous animal cages.

While the invention has been herein disclosed with respect to a single preferred embodiment, it will be apparent to those skilled in the art that numerous variations and modifications may be made without departing from the spirit and scope of the invention. For example, although, in our opinion, laboratory animals of the order Rodentia are at least as happy in a completely enclosed cage as one having wire grid tops or sides to permit a view of the room, some laboratories may prefer their animals to have such a view. To accomplish this end, a portion of one of the side walls of receptacle 11 may be perforated in the manner of the perforations 33, 34 provided in the top wall of lid 12. A complete closure of the cage may then be provided as desired in a like manner by means of a sliding cover plate similar to cover plate 36. Still other modifications may be made in the cage of the present invention. For instance, where it is not desirable to have animals rest directly on bedding in the bottom of receptacle 11, a suitable grid may be supported between the side walls thereof slightly above the bottom. Animal wastes will then drop through the holes in the grid and collect on the layer of bedding or solid detergent placed on the bottom of the receptacle. Moreover, as a further embodiment of the invention, the perforations in the top wall 19 of lid 12, as well as the water bottle holder 42, can be located advantageously in a variety of positions to suit individual needs. For example, rectangular opening 39 for food-chute, and water bottle holder 42 may be located at the same end of the cage as perforations 33 thereby resulting in a convenient grouping of the various cage accessories at whichever side of the cage which may face into the room from the shelf rack whereupon the cages may be customarily placed. Thus, it is not intended to limit the invention except by the terms of the following claims.

What is claimed is:

1. An improved animal cage comprising a substantially rectangular open-topped receptacle for accommodating laboratory animals, and a lid for closing the open top of said receptacle, said lid having a top wall and pendent end and side walls, said end walls engaging the rim of said receptacle and supporting said top wall in elevated position above said rim with the lower edges of the end walls of said lid closely abutting against the inner end wall surfaces of said receptacle, said side walls of the lid overhanging the rim of said receptacle in outwardly spaced relation thereto to provide louvered air passages therebetween, whereby said lid and receptacle provide a complete closure into which air may freely pass for ventilation.

2. An animal enclosure comprising a substantially rectangular receptacle for accommodating laboratory animals, said receptacle having a bottom wall and side and end walls outwardly tapered therefrom and extending upwardly to a top rim, and a detachable lid for closing the top of said receptacle, said lid having a top wall and outwardly tapered pendent end walls and side wall louvers, said end walls each having notches for engaging the rim of said recptacle and elevating the top wall above said rim while the lower edges of said end walls are in close abutment with the inner surfaces of the end walls of said receptacle, said side wall louvers extending below said rim and being spaced from said rim to permit free passage of air therebetween.

3. An improved animal cage comprising a substantially rectangular receptacle for accommodating laboratory animals, said receptacle having a bottom wall and side and end walls with rounded portions connecting said walls, said side and end walls outwardly tapered from said bottom wall and extending upwardly to a rounded rim, a detachable lid for closing the top of said receptacle and having a top wall and outwardly tapered pendent side and end walls with rounded portions connecting said walls, said end walls each having notches for engaging the rim of said receptacle to dispose the lower edges of the end walls of said lid in close abutment with the inner surfaces of the end walls of said receptacle and support said top wall in elevated position with respect to said rim, said side walls of the lid extending below said rim and being spaced outwardly from said rim to provide air passages therebetween, and a pair of L-shaped handles respectively journalled to the end walls of said receptacle and rotatable to a position of engagement with said lid to lock same atop of said receptacle.

References Cited in the file of this patent

UNITED STATES PATENTS

| 2,467,525 | Fricke | Apr. 19, 1949 |

FOREIGN PATENTS

| 682,198 | Great Britain | Nov. 5, 1952 |